(12) United States Patent
Turullols et al.

(10) Patent No.: US 8,261,019 B2
(45) Date of Patent: Sep. 4, 2012

(54) CONVEYING CRITICAL DATA IN A MULTIPROCESSOR SYSTEM

(75) Inventors: Sebastian Turullols, Los Altos, CA (US); Sumti Jairath, Santa Clara, CA (US)

(73) Assignee: Oracle America, Inc., Redwood City, CA (US)

( * ) Notice: Subject to any disclaimer, the term of this patent is extended or adjusted under 35 U.S.C. 154(b) by 737 days.

(21) Appl. No.: 12/370,757

(22) Filed: Feb. 13, 2009

(65) Prior Publication Data

US 2010/0211742 A1 Aug. 19, 2010

(51) Int. Cl.
*G06F 12/00* (2006.01)
*G06F 13/00* (2006.01)
(52) U.S. Cl. .............................. 711/118; 711/119; 71/35
(58) Field of Classification Search .................. None
See application file for complete search history.

(56) References Cited

U.S. PATENT DOCUMENTS

| 5,627,991 | A  | * | 5/1997 | Hose et al. ..................... 711/129 |
| 6,366,989 | B1 |   | 4/2002 | Keskar et al. |
| 6,751,705 | B1 |   | 6/2004 | Solomon et al. |
| 6,968,402 | B2 | * | 11/2005 | Jackson et al. .................. 710/52 |
| 6,981,106 | B1 | * | 12/2005 | Bauman et al. ............... 711/146 |
| 7,337,272 | B2 |   | 2/2008 | Morrow |

* cited by examiner

*Primary Examiner* — Kevin Ellis
*Assistant Examiner* — Stella Eun
(74) *Attorney, Agent, or Firm* — Meyertons, Hood, Kivlin, Kowert & Goetzel, P.C.; Stephen J. Curran (57) ABSTRACT

A system for conveying critical and non-critical words of multiple cache lines includes a first node interface of a first processing node receiving, from a first processor, a first request identifying a critical word of a first cache line and a second request identifying a critical word of a second cache line. The first node interface conveys requests corresponding to the first and second requests to a second node interface of a second processing node. The second node interface receives the corresponding requests and conveys the critical words of the first and second cache lines to the first processing node before conveying non-critical words of the first and second cache lines.

20 Claims, 7 Drawing Sheets

CONVEYING CRITICAL DATA IN A MULTIPROCESSOR SYSTEM

BACKGROUND OF THE INVENTION

1. Field of the Invention

This invention relates to multiprocessor systems, and more particularly to the transmission of critical data between processors.

2. Description of the Related Art

Modern computer systems typically implement a memory hierarchy in which a processor maintains frequently accessed data in one or more onboard caches. In general, this stored data is a duplicate of data stored elsewhere in a system memory. When a processor needs data, the processor typically fetches the desired data from memory (such as, for example, a memory in the random access memory (RAM) family) and loads it into the cache for future use. In some systems, this fetched data may include only the desired data (i.e., critical data), while in other systems the fetched data may include an entire cache line containing both critical data and other non-critical data.

Some computer systems are now using multiple processors either located on a single die, or module, or coupled together via a bus. Frequently, these processors share memory that contains data that is accessible by each of the processors. For example, a pair of processors may each be coupled to a common memory, or may each be coupled to separate, accessible memories. In either situation, the processors may share the stored data. Accordingly, various techniques have been implemented to maintain coherency between the shared memory and the onboard caches located on each of the processors. In some conventional systems, the latency associated with receiving the critical data can be problematic.

SUMMARY

Various embodiments of a system and method for conveying critical and non-critical words of multiple cache lines are disclosed. In one embodiment, a computer system includes a first processing node including a first processor, a first cache, and a first node interface. The computer system also includes a second processing node coupled to the first processing node, where the second processing node includes a second processor, a second cache, and a second node interface. The first node interface may be configured to receive, from the first processor, a first request identifying a critical word of a first cache line and receive, from the first processor, a second request identifying a critical word of a second cache line. The first node interface may be further configured to convey requests corresponding to the first and second requests to the second node interface. The second node interface may be configured to receive the corresponding requests and convey the critical words of the first and second cache lines to the first processing node before conveying non-critical words of the first and second cache lines.

In another embodiment, a method for conveying critical and non-critical words of multiple cache lines includes a first node interface of a first processing node receiving, from a first processor, a first request identifying a critical word of a first cache line and the first node interface receiving, from the first processor, a second request identifying a critical word of a second cache line. The method may further include the first node interface conveying requests corresponding to the first and second requests to a second node interface of a second processing node and the second node interface conveying the critical words of the first and second cache lines to the first processing node before conveying non-critical words of the first and second cache lines.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must). This specification also includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

DETAILED DESCRIPTION

Figure 1:
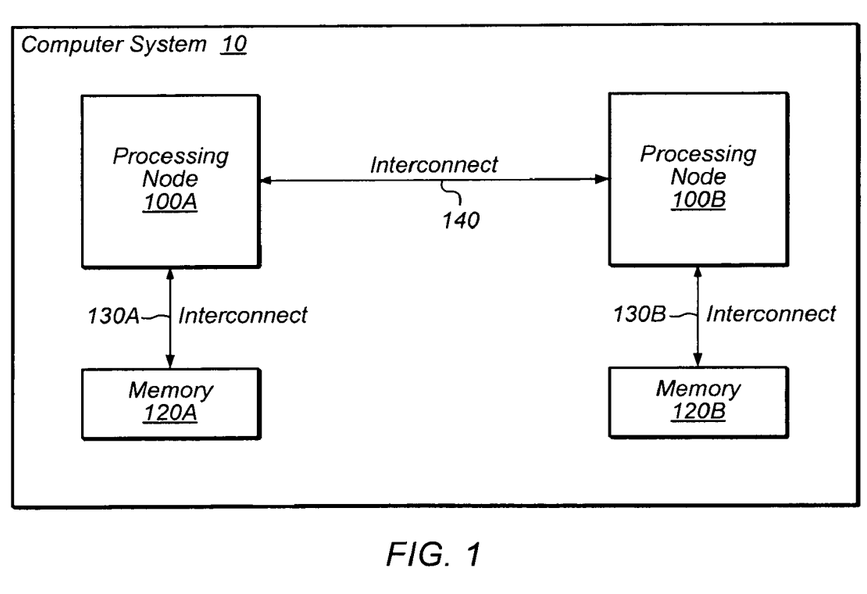
FIG. 1 is a block diagram of one embodiment of a computer system.

Turning now to FIG. 1, a block diagram illustrating one embodiment of a computer system 10 is shown. Computer system 10 includes processing nodes 100A and 100B coupled together via an interconnect 140. (It is noted that processing nodes 100A and 100B may be jointly referred to as processing nodes 100 and generically referred to as a processing node 100, when appropriate. Other elements may be described herein in a similar manner.) Each processing node 100, in turn, is coupled to a respective memory, 120A and 120B, via a respective interconnect, 130A and 130B. Although only two processing nodes 100 are shown, it is contemplated that other numbers of nodes coupled to respective memories may be used in other embodiments. Computer system 10 may be representative of any of various types of systems, including, but not limited to, a personal computer system, desktop computer, laptop or notebook computer, mainframe computer system, handheld computer, server, workstation, network computer, a consumer device such as a mobile phone, pager, personal data assistant (PDA), and the like. Computer system 10 may also be representative of any type of networked peripheral device such as a storage device, switch, modem, router, etc. Although a single computer system 10 is shown in FIG. 1 for convenience, computer system 10 may also be implemented as two or more computer systems operating together.

Processing nodes 100 may each include one or more processors or processing units. For example, each processing node 100 may include a plurality of processing cores that share common circuitry (e.g., caches, I/O interfaces, etc.). In one embodiment, processing nodes 100 may be located on the same die. In another embodiment, processing nodes 100 may be located on separate die. An exemplary processing node 100 is described in greater detail below in conjunction with the description of FIG. 2 below.

Memory 120A and 120B (or simply, memory 120) may be implemented using different physical memory media, such as hard disk storage, floppy disk storage, removable disk storage, flash memory, any device in the random access memory (RAM) family of devices—such as static RAM (SRAM), synchronous dynamic RAM (SDRAM), double data rate SDRAM (DDR SDRAM), for example, and additionally memory modules such as single inline memory module (SIMM), dual inline memory module (DIMM), fully buffered dual inline memory module (FB-DIMM). Further, memory 120 may also include memory devices in the read only memory (ROM) family such as programmable ROM (PROM), electrically erasable PROM (EEPROM), and so on. Memory in computer system 10 is not limited to memory 120. Rather, computer system 10 may be said to have a "memory subsystem" that includes various types/locations of memory. For example, the memory subsystem of computer system 10 may, in one embodiment, include memory 120, cache memory (shown in FIG. 2) in processing nodes 100, and storage coupled via I/O Devices (e.g., a hard drive, storage array, etc.). Thus, the phrase "memory subsystem" may be representative of various types of possible memory media within computer system 10. In some embodiments, the memory subsystem may store program instructions executable by processing nodes 100.

In one embodiment, memory 120 may be configured as a word addressable architecture in which each word of memory has a corresponding physical address. As used herein, the term "word" may apply to any number of bytes, and a cache line may include a plurality of words. For example, a word, in one particular embodiment, may be a 16-byte block of data, and a cache line may include four words or 64 bytes. However, in other embodiments, memory 120 may implement any of variety of addressable architectures as desired.

Interconnect 140, in one embodiment, is a bus circuit for exchanging information between processing node 100A to processing node 100B. In some embodiments, interconnect 140 may be configured to communicate different types of traffic using different respective "virtual channels." In various embodiments, communication over interconnect 140 may employ a packet-based protocol such as Quick Path™, Hyper Transport™, PCI-Express™, etc.

As will be described in greater detail below, processing nodes 100 may be configured to access their respective local memories (i.e., memory that is directly connected to the processing nodes 100 (e.g., node 100A and memory 120A)) and remote memories of other processing nodes 100 (i.e., memory that is not directly connected to the processing nodes 100 (e.g., node 100A and memory 120B)). In one embodiment, processing nodes 100 access memory on a cache line basis during which a processor may request a particular word and in response receive an entire cache line of data, where the cache line includes both the requested (i.e., critical) word and any other non-critical words that are part of the cache line. As described in greater detail below, in various embodiments, processing nodes 100 may implement various techniques to convey the critical words of multiple cache lines from one processing node 100 to another node 100 before conveying non-critical words of the multiple cache lines.

Figure 2:
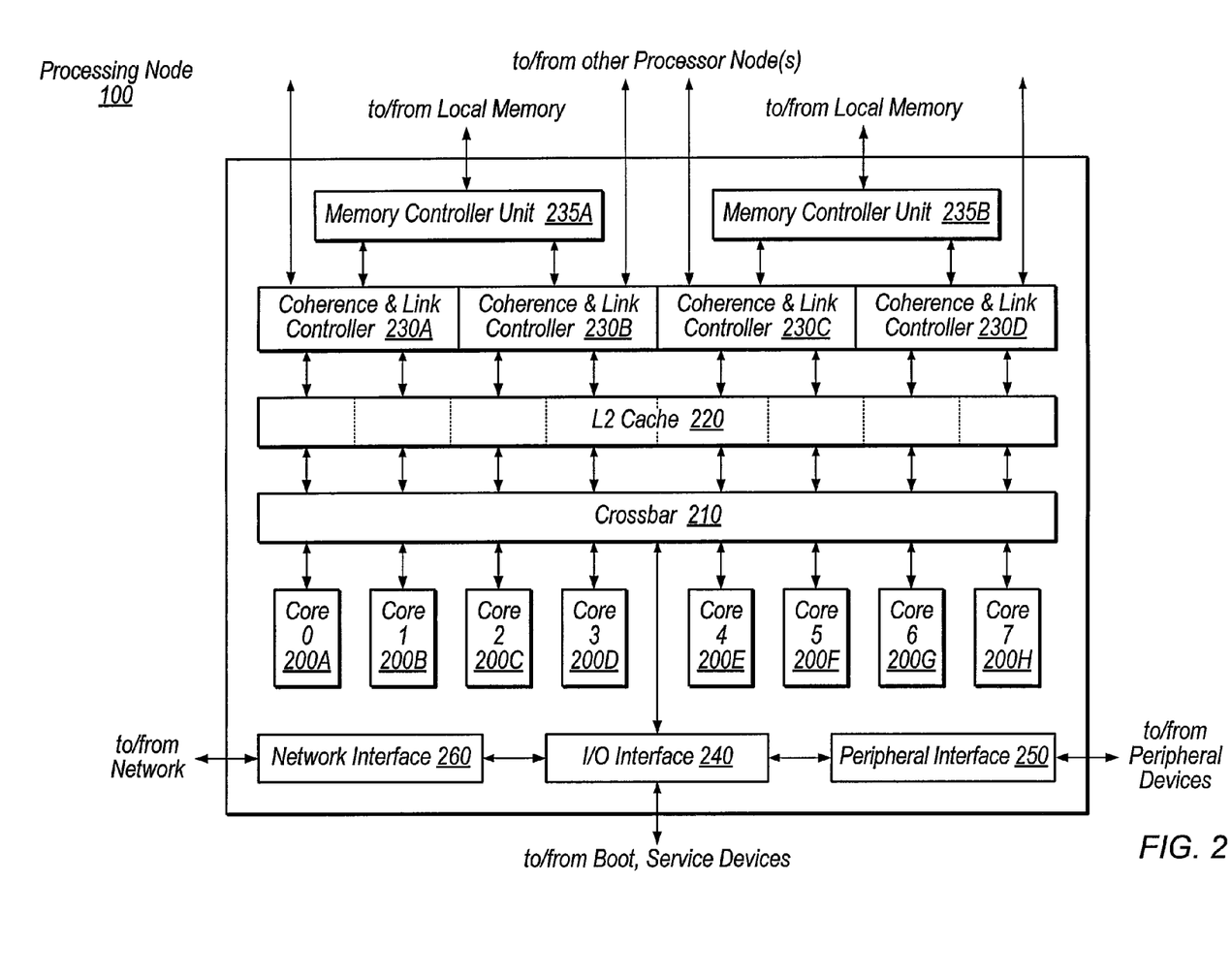
FIG. 2 is a block diagram of one embodiment of a processing node of the system shown in FIG. 1.

Referring to FIG. 2, a block diagram of one embodiment of a processing node of the system of FIG. 1 is shown. It is noted that processing node 100 may be representative of either processor node 100A or 100B. In the illustrated embodiment, processing node 100 includes a plurality of processor cores 200A-200H, which are also designated "Core 0" though "Core 7." Each of cores 200 is coupled to an L2 cache 220 via a crossbar 210. L2 cache 220 is coupled to one or more coherence and link controllers (CLC) 230A-D, which in turn are coupled to a memory controller unit (MCU) 235A or 235B, and one or more other processing nodes 100 (not shown in FIG. 2). Each memory controller unit 235 is further coupled to one or more banks of local system memory (not shown in FIG. 2). Additionally, crossbar 210 is coupled to input/output (I/O) interface 240, which is in turn coupled to peripheral interface 250 and network interface 260. I/O interface 240, peripheral interface 250, and network interface 260 may respectively couple processing node 100 to boot and/or service devices, peripheral devices, and a network. (Note that this block diagram is exemplary only and that various ones of the blocks may be replaced, modified, or connected differently, as desired.)

In various embodiments, cores 200 may be configured to execute instructions and to process data according to a particular instruction set architecture (ISA). In one embodiment, cores 200 may be configured to implement the SPARC® V9 ISA, although in other embodiments it is contemplated that any desired ISA may be employed, such as x86, PowerPC® or MIPS®, for example. In the illustrated embodiment, each of cores 200 may be configured to operate independently of one another, and all cores 200 may execute in parallel. Additionally, in some embodiments each of cores 200 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 200 may also be referred to as a multithreaded (MT) core. In one embodiment, each of cores 200 may be configured to concurrently execute instructions from eight different threads, for a total of 64 threads concurrently executing across processing node 100. However, in other embodiments it is contemplated that other numbers of cores 200 may be provided, and that cores 200 may concurrently process different numbers of threads.

Crossbar 210 may be configured to manage data flow between cores 200 and the shared L2 cache 220. In one embodiment, crossbar 210 may include logic (not shown) such as multiplexers or a switch fabric, for example, that allows any core 200 to access any bank of L2 cache 220, and that conversely allows data to be returned from any L2 bank to any core 200. Crossbar 210 may be configured to concurrently process data requests from cores 200 to L2 cache 220 as well as data responses from L2 cache 220 to cores 200. In some embodiments, crossbar 210 may include additional logic (not shown) to queue data requests and/or responses, such that requests and responses may not block other activity while waiting for service. Additionally, in one embodiment crossbar 210 may be configured to arbitrate conflicts that may occur when multiple cores 200 attempt to access a single bank of L2 cache 220 or vice versa.

L2 cache 220 may be configured to cache instructions and data for use by cores 200. In the illustrated embodiment, L2 cache 220 may be organized into eight separately addressable banks (as denoted by the dashed lines) that may each be independently accessed, such that in the absence of conflicts, each bank may concurrently return data to a respective core 200. In some embodiments, each individual bank may be implemented using set-associative or direct-mapped techniques. For example, in one embodiment, L2 cache 220 may be a four megabyte (MB) cache, where each 512 kilobyte (KB) bank is 16-way set associative with a 64-byte line size, although other cache sizes and geometries are possible and contemplated. L2 cache 220 may be implemented in some embodiments as a writeback cache in which written (dirty) data may not be written to system memory until a corresponding cache line is evicted.

In some embodiments, L2 cache 220 may implement queues for requests arriving from and results to be sent to crossbar 210. Additionally, in some embodiments L2 cache 220 may implement a fill buffer configured to store fill data arriving from a CLC 230 and/or a writeback buffer configured to store dirty evicted data to be written to memory. In various embodiments, L2 cache 220 may also implement a miss buffer configured to store L2 cache accesses that cannot be processed as simple cache hits (e.g., L2 cache misses, cache accesses matching older misses, accesses such as atomic operations that may require multiple cache accesses, etc.). L2 cache 220 may variously be implemented as single-ported or multiported (i.e., capable of processing multiple concurrent read and/or write accesses). In either case, L2 cache 220 may implement arbitration logic (not show) to prioritize cache access among various cache read and write requestors.

Coherence and Link Controllers (CLC) 230A-D may be configured as node interfaces that manage the transfer of data between processing node 100 and remote/local memories (e.g. memory 120A and 120B). In one embodiment, each CLC 230 is configured to receive L2 fill requests and data evictions generated by L2 cache 220. For example, a CLC 230 may receive a request for a particular word and convey a corresponding request for that word to either memory controller unit 235 or a CLC 230 located in another processing node 100 associated with a remote memory. In one embodiment, CLCs 230 provide a uniform view of memory where a physical address space is partitioned among local and remote memory and where each CLC 230 manages the transfer of data associated with a particular portion of memory (e.g., a particular memory bank or a particular block of physical addresses).

Each CLC 230 may be configured to receive L2 fill requests and data evictions from other CLCs 230 located in other processing nodes 100 and convey corresponding requests to a memory controller unit 235 coupled to a local memory. As will be described in greater detail below, CLCs 230 may, in various embodiments, implement various techniques to convey the critical words of multiple requested cache lines before conveying the non-critical words of these cache lines.

In some embodiments, CLCs 230 may be configured to implement a memory coherency protocol in which CLCs 230 exchange memory coherency messages to determine whether particular cached entries are dirty or invalid. In one embodiment, CLCs 230 implement a snooping protocol in which the CLCs 230 of one processing node 100 transmit requests to CLCs 230 in other processor node(s) 100 to ask whether particular cache lines are dirty. In another embodiment, the CLCs 230 may be configured to implement a write-invalidate protocol in which a processing node 100 advertises to other processing node(s) 100 when cache lines become dirty. In other embodiments, CLCs 230 may implement a system of locks and/or semaphores to maintain memory coherence. In various embodiments, CLCs 230 may implement any of variety of coherency protocols such as directory, MSI, MESI, MOSI, MOESI, etc.

Memory controller units 235A and 235B may be configured to manage the transfer of data from/to local system memory (e.g., processing node 100A and memory 120A). Memory controller units 235 may service fill requests or data evictions generated locally by L2 cache 220 or requests generated by another processing node 100. In the illustrated embodiment, memory controller units 235A and 235B receive requests from respective pairs of CLCs 230. Memory controller units 235 may access memory on a word basis or on a cache line basis. In some embodiments, multiple instances of memory control units 235 may be implemented, with each instance configured to control a respective bank of system memory. Memory controller units 235 may be configured to interface to any suitable type of system memory, such as those described above in conjunction with FIG. 1. In some embodiments, memory controller units 235 may be configured to support interfacing to multiple different types of system memory.

In the illustrated embodiment, processing node 100 may also be configured to receive data from sources other than system memory. For example, I/O interface 240 may be configured to provide a central interface for such sources to exchange data with cores 200 and/or L2 cache 220 via crossbar 210. In some embodiments, I/O interface 240 may be configured to coordinate Direct Memory Access (DMA) transfers of data between network interface 260 or peripheral interface 250 and system memory via memory controller units 235. In addition to coordinating access between crossbar 210 and other interface logic, in one embodiment I/O interface 240 may be configured to couple processing node 100 to external boot and/or service devices. For example, initialization and startup of processing node 100 may be controlled by an external device (such as a Field Programmable Gate Array (FPGA)) that may be configured to provide an implementation-specific or system-specific sequence of boot instructions and data. Such a boot sequence may, for example, coordinate reset testing, initialization of peripheral devices and initial execution of processing node 100, before the boot process proceeds to load data from a disk or network device. Additionally, in some embodiments such an external device may be configured to place processing node 100 in a debug, diagnostic, or other type of service mode upon request.

Peripheral interface 250 may be configured to coordinate data transfer between processing node 100 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 250 may implement one or more instances of an interface such as Peripheral Component Interface Express (PCI-Express™), although it is contemplated that any suitable interface standard or combination of standards may be employed. For example, in some embodiments peripheral interface 250 may be configured to implement a version of Universal Serial Bus (USB) protocol or Institute of Electrical and Electronics Engineers (IEEE) 1394 (Firewire®) protocol in addition to or instead of PCI-Express.

Network interface 260 may be configured to coordinate data transfer between processing node 100 and one or more devices (e.g., other computer systems) coupled to processing node 100 via a network. In one embodiment, network interface 260 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 260 may be configured to implement multiple discrete network interface ports.

Figure 3:
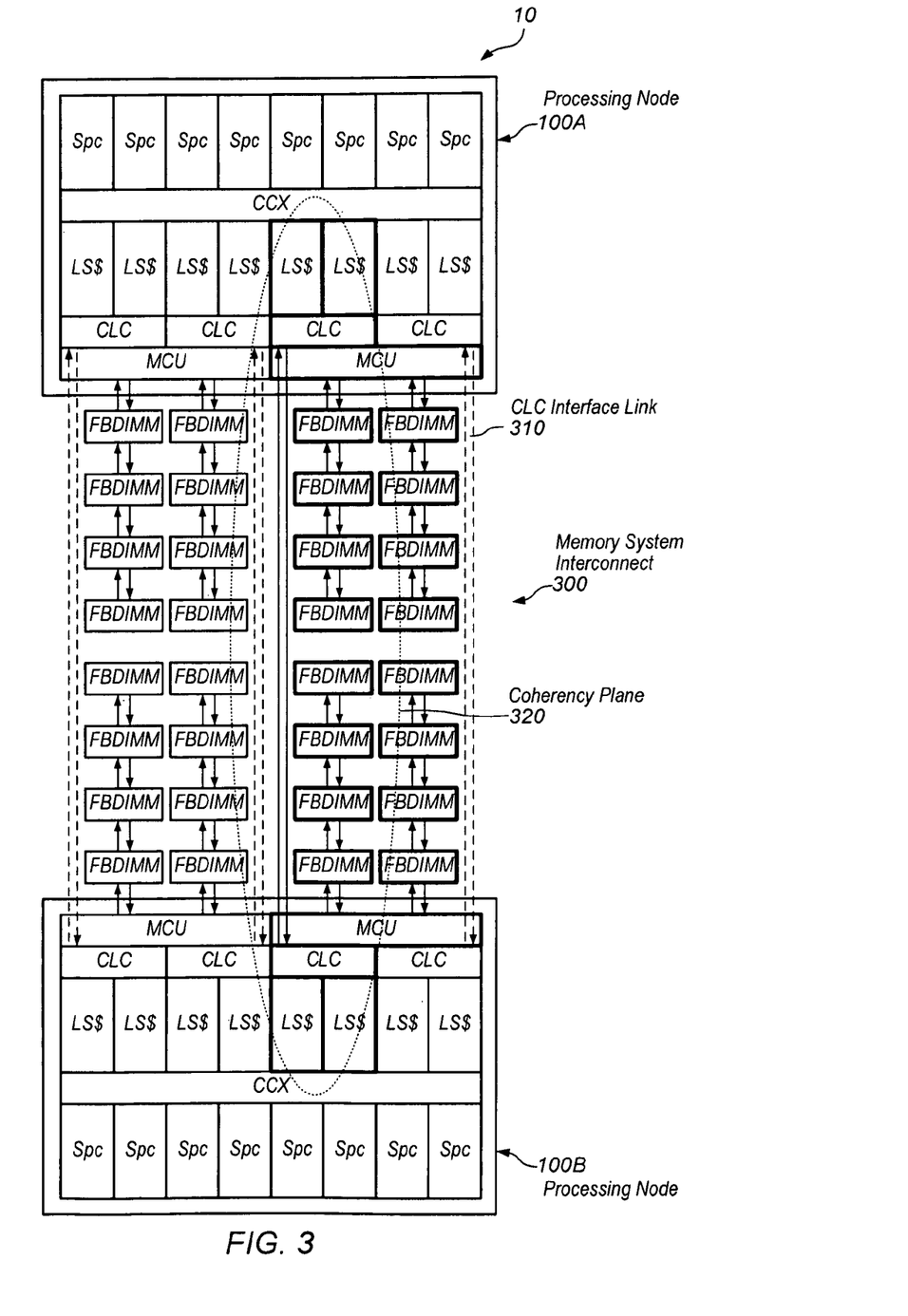
FIG. 3 is a block diagram of one embodiment of the memory system interconnect shown in FIG. 1.

FIG. 3 is a block diagram of one embodiment of the memory system interconnect shown in FIG. 1. In the illustrated embodiment, memory system interconnect 300 includes the CLCs 230 of processing node 100A and the CLCs 230 of processing node 100B that are connected together via CLC interface links 310. In one embodiment, each CLC interface link 310 is a serialized, inter-socket bus (e.g., 14 wires wide with a transfer rate of 4.8 gigabits per second). In some embodiments, CLC interface links 310 may support variable sized data frames. In other embodiments, CLC interface links 310 may support fixed sized (e.g., a 16 byte word) data frames. In various embodiments, each CLC interface link data frame is assigned a unique transaction identifier in order to distinguish between data frames.

As shown in FIG. 3, a coherency plane 320 includes a grouping of L2 caches 220, CLCs 230, and FBDIMMs as denoted by the dotted line ellipse. In one embodiment, each of the components in a coherency plane 320 is configured to operate independently of other coherency planes (e.g., CLCs 230 coupled via one CLC interface link 310 may service requests independently of CLCs 230 coupled via a different CLC interface link 310). In some embodiments, coherency planes 320 may share common components (e.g., a pair of CLCs 230 from different coherency planes 320 may share a MCU 235, a common set of FBDIMMs, etc.). In one embodiment, physical addresses are partitioned among coherency planes 320 so that each coherency plane 320 only manages the transfer of data for a particular portion of memory (e.g., each coherency plane 320 may only convey traffic associated with a particular address range). In other embodiments, each coherency plane 320 is configured to access any portion of memory.

In one embodiment, CLC interface links 310 communicate different types of traffic via different respective "virtual channels." For example, CLC interface links 310 may communicate data requests via a request channel, coherency messages via a coherency channel, and data via a data channel. In various embodiments, CLC interface links 310 may communicate non-critical data and critical data via respective non-critical data and critical data virtual channels. As will be described in greater detail below, CLC interface links 310 may provide different qualities of service for different virtual channels.

Figure 4:
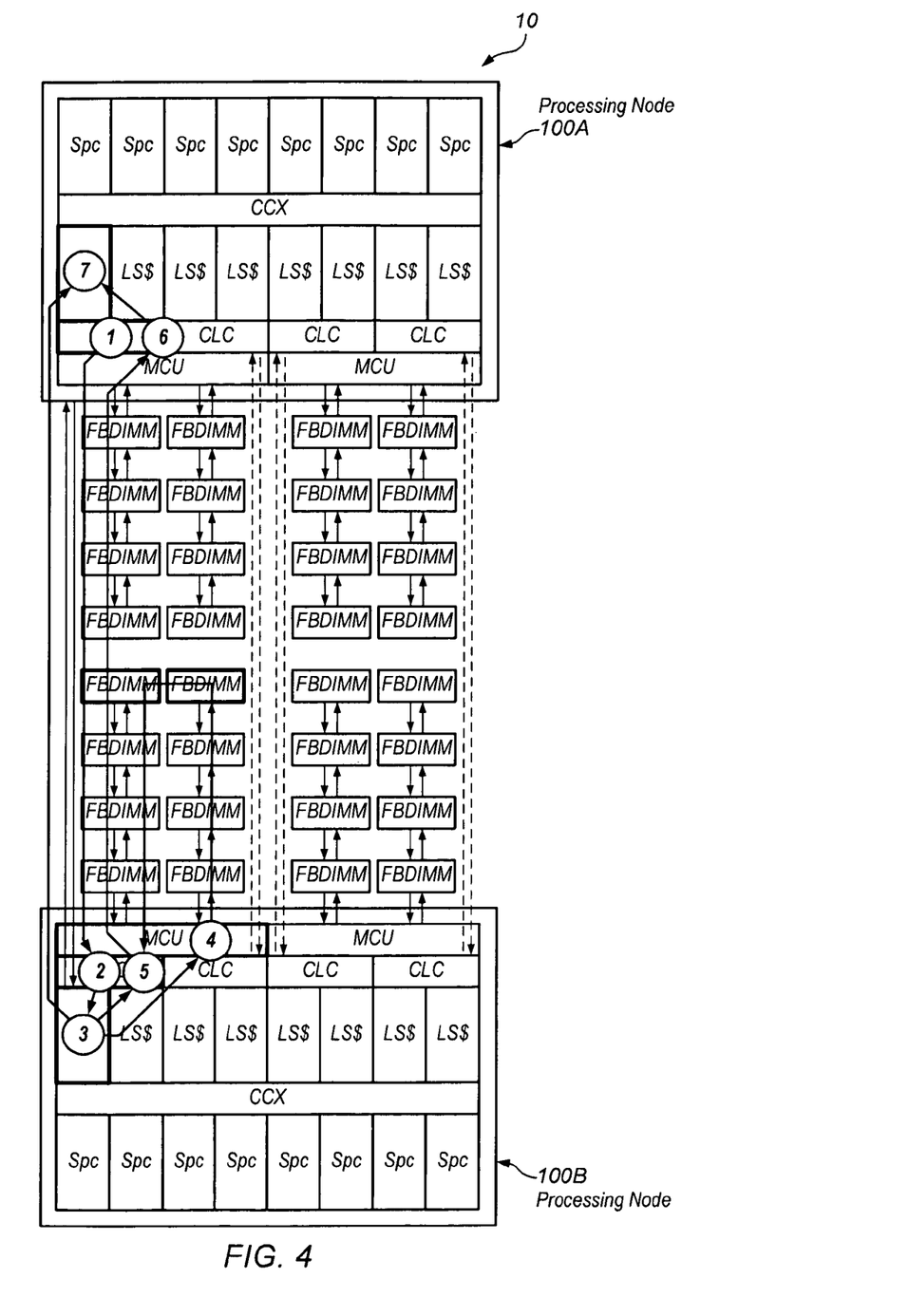
FIG. 4 is a diagram illustrating an operational sequence for accessing a remote memory of one embodiment of the system shown in FIG. 1 and FIG. 3.

FIG. 4 is a diagram illustrating an operational sequence for accessing a remote memory (e.g., during write or read operations) of one embodiment of the system shown in FIG. 1 and FIG. 3. In the illustrated embodiment, various operations are denoted by the numbers 1-7. At position 1, a local CLC 230 of processing node 100A sends a request for particular word to a remote CLC 230 of processing node 100B. At position 2, the remote CLC 230 may send an indication acknowledging the receipt of the request back to the local CLC 230 in node 100A and a snoop request to the L2 cache 220 of processing node 100B. At position 3, the L2 cache 220 indicates whether it is storing the requested word (i.e., an indication of a cache hit or miss) and provides the cache line of the requested word to the remote CLC 230 if it is available. At position 4, if a cache miss occurs, a request is sent to an MCU 235 of node 100B, where the cache line of the requested word is retrieved from memory. At position 5, the remote CLC 230 is provided with the cache line from either the L2 cache 220 or MCU 235. At position 6, the CLC 230 of node 100A receives the cache line from the CLC 230 of node 100B. In various embodiments (described in greater detail below), the CLC 230 of node 100B conveys the critical words of requested cache lines to the CLC 230 of node 100A before conveying non-critical words of the requested cache lines. At position 7, the CLC 230 of node 100A provides the cache line to the L2 cache 220 of node 100A, where an allocated entry is subsequently filled. (Note that the diagram is exemplary only and that the operational sequence may be performed differently in other embodiments, as desired.)

Figure 5:
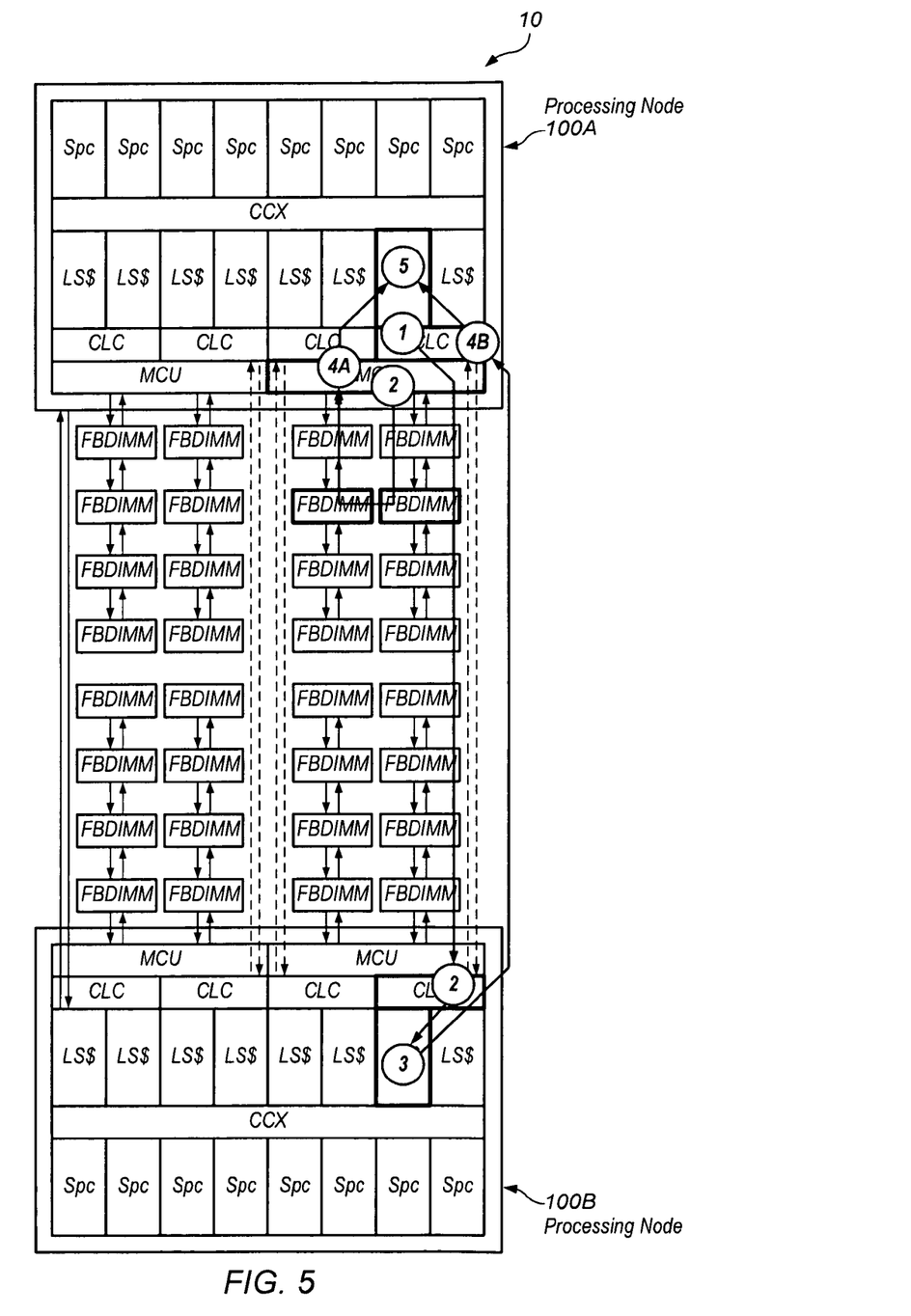
FIG. 5 is a diagram illustrating an operational sequence for accessing a local memory of one embodiment of the system shown in FIG. 1 and FIG. 3.

FIG. 5 is a diagram illustrating an operational sequence for accessing a local memory of one embodiment of the system shown in FIG. 1 and FIG. 3. As shown, various operations are denoted by the numbers 1-5. In some embodiments, various operations may be performed in parallel or substantially parallel such as, for example, operations indicated by positions 4A and 4B. At position 1, a local CLC 230 in processing node 100A sends a snoop request for a particular word to a remote CLC 230 in processing node 100B. At position 2, local CLC 230 transmits a corresponding request to an MCU 235 of processing node 100A, and MCU 235 accesses memory for the requested word. Meanwhile, remote CLC 230 sends a corresponding request to an L2 cache 220 located in processing node 100B. At position 3, if a cache hit occurs, the L2 cache 220 indicates to the remote CLC 230 whether the requested word is dirty or not and provides the cache line of the requested word if it is dirty to the remote CLC 230. At position 4A, MCU 235 retrieves the cache line of the requested word from memory. At position 4B, the remote CLC 230 may transmit a response back to the local CLC 230. At position 5, the cache line of the requested word is provided to the local L2 cache 220 and the corresponding entry is filled. (Note that the diagram is exemplary only and that the operational sequence may be performed differently in other embodiments, as desired.)

Figure 6:
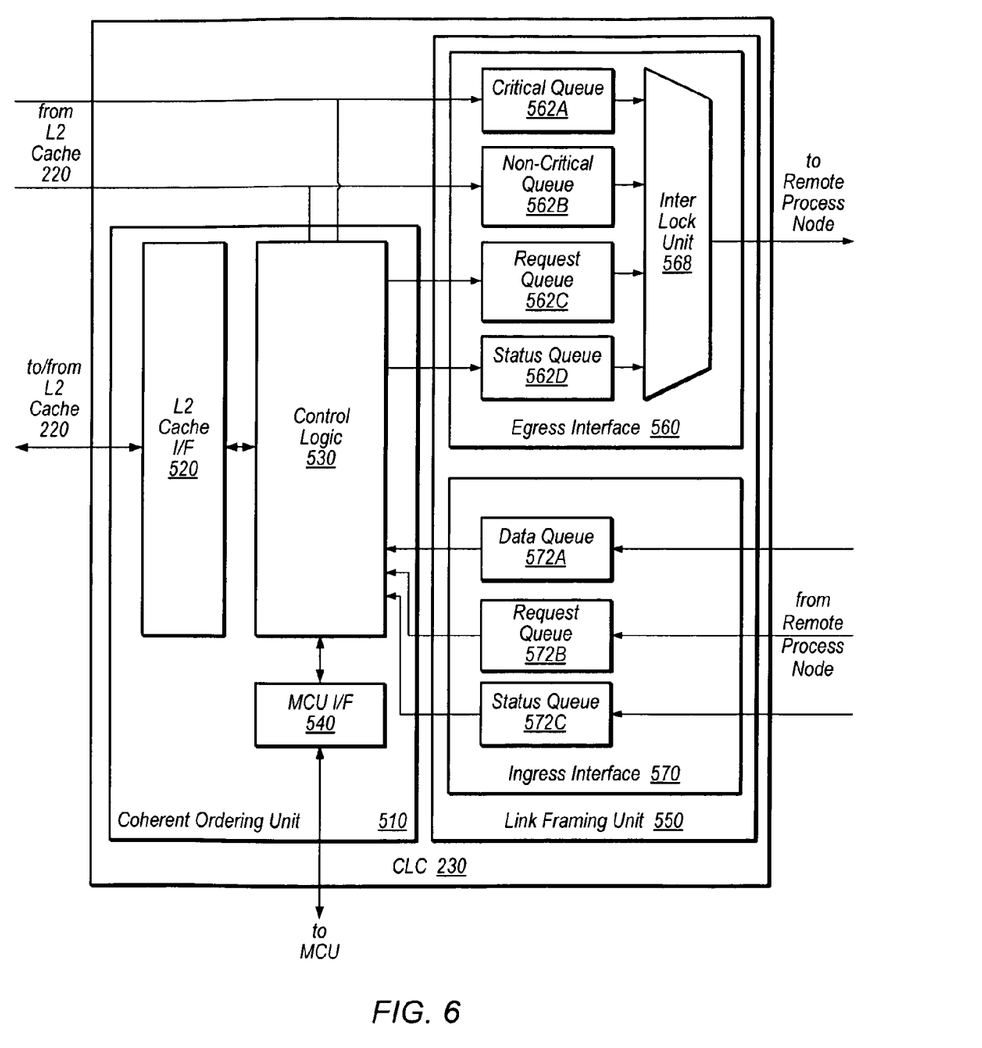
FIG. 6 is a block diagram of one embodiment of a coherence and link controller (CLC) shown in FIG. 2-FIG. 5.

FIG. 6 is a block diagram of one embodiment of a coherence and link controller (CLC) shown in FIG. 2-FIG. 5. In the illustrated embodiment, CLC 230 includes coherence ordering unit (COU) 510 and link framing unit (LFU) 550. COU 510 includes control logic 530 that is coupled to L2 cache interface 520 and MCU interface 540. LFU 550 includes egress interface 560 and ingress interface 570. Egress interface 560 includes critical queue 562A, non-critical queue 562B, request queue 562C, and status queue 562D that are each coupled to an interlock unit 568. Ingress interface 570 includes data queue 572A, request queue 572B, and status queue 572C.

Coherence ordering unit (COU) 510 may be configured to manage communication between an L2 cache 220 (via each L2 interface 520), MCU 235 (via MCU interface 540), and one or more remote processing nodes 100 (via LFU 550). In some embodiments, COU 510 may also include control logic 530 to perform such operations. In particular, COU 510 may receive L2 fill requests and data evictions from an L2 cache 220 and determine whether the particular data is stored in a local memory or a remote memory based on the addresses of requested words. If the requested data is stored in a local memory, COU 510 may provide a corresponding request to an MCU 235 coupled to the local memory and provide a corresponding coherency message to other processing nodes 100 via LFU 550. On the other hand, if the requested data is stored in a remote memory, COU 510 may provide a corresponding data request to the appropriate processing node 100 via LFU 550.

Similarly, COU 510 may be configured to receive L2 fill requests and data evictions from another processor node 100 via LFU 550. Upon receipt of such a request, COU 510 may first determine whether the requested data is stored in an L2 cache 220. If a cache hit occurs, COU 510 may then fetch the requested data from the L2 cache 220 and provide the data to LFU 550 for transmission to the requesting processing node 100. Alternatively, if a cache miss occurs, COU 510 may then provide a corresponding request to an MCU 235 that is coupled to the memory that stores the requested data.

In some embodiments, COU 510 may also be configured to receive coherency messages from other processing nodes 100. When COU 510 receives a coherency message, COU 510 may first determine whether a dirty copy of the data is stored in an L2 cache 220. If a dirty copy exists, COU 510 may then provide the dirty cache line to LFU 550 for transmission to the requesting processing node 100. On the other hand if no dirty copy is cached, in one embodiment, COU 510 provides an indication as such. However, in other embodiments, COU 510 may not provide any such indication when no dirty copy is cached.

Link framing unit (LFU) 550 may be configured as an interfacing unit that communicates over a coherency interface link 310. To this end, LFU 550 may employ any of a variety of network protocols such as Quick Path™, PCI Express™, Hyper Transport™, InfiniBand™, etc. In one embodiment, CLC interconnect 310 implements a transaction layer that uses packets with variable frame sizes. In some embodiments, LFU 550 assigns transaction IDs to distinguish between different packets. In one embodiment, LFU 550 is configured to generate data packet traffic associated with various virtual channels.

Ingress interface 570 may be configured to decode and manage inbound traffic received from remote processing nodes 100. In the illustrated embodiment, ingress interface 570 stores inbound traffic (i.e., traffic that has been received but prior to it being serviced by control logic 530) in data queue 572A, request queue 572B, and status queue 572C. Data queue 572A may store any received data that was previously requested by CLC 230. In one embodiment, data queue 572A implements an external writeback data buffer usable by an MCU 230. In other embodiments, data queue 572A may implement a copyback input buffer, a non-cacheable input buffer, etc (all not shown). In some embodiments, data queue 572A may store critical and non-critical data, while in other embodiments, separate critical and non-critical queues may be employed. Request queue 572B may store requests for various data words that are received from other processing nodes 100. In one embodiment, request queue 572B may additionally store request acknowledgements that have been generated by other processing nodes 100 in response to previously transmitted data requests. Status queue 572C may store memory coherency messages received from other processing nodes 100. In one embodiment, the memory coherency messages stored in status queue 572C are snoop requests and responses to previously transmitted snoop requests. In another embodiment, status queue 576 stores write-invalidate responses.

Egress interface 560 may be configured to generate and encode outbound traffic destined for other processing nodes 100. In the illustrated embodiment, egress interface 560 stores outbound traffic (i.e., traffic that is scheduled to be transmitted but prior to transmission) in critical queue 562A, non-critical 562B, request queue 562C, and status queue 562D. Critical queue 562A may store any critical words of cache lines that are requested by other processing nodes 100. Non-critical queue 562B may store any non-critical words associated with requested cache lines. In one embodiment, non-critical queue 562B additionally stores requested non-cacheable data such as, for example, data received from I/O interface 240, peripheral interface 250, network interface 260, etc. Request queue 562C may store outbound data requests destined for other processing nodes 100. In some embodiments, request queue 562C may also store outbound request acknowledgements generated in response to received data requests. Status queue 562D may store outbound memory coherency messages. In one embodiment, coherency messages stored in status queue 562D are responses to previously received snoop requests. In another embodiment, status queue 566 may store write-invalidate responses.

As mentioned above, coherency interface links 310 may communicate data traffic using different virtual channels. In one embodiment, each queue 562 is associated with a respective virtual channel of a coherency interface link 310. Alternatively, some queues 562 may share a virtual channel.

In the illustrated embodiment, interlock 568 arbitrates between queues 562. Interlock 568 may be configured to service queues so that egress interface 560 conveys the critical words of multiple cache lines before conveying the non-critical words of the cache lines. As such, interlock unit 568 may implement any of a variety of queuing algorithms for servicing queues 562. In one embodiment, interlock 568 services queues 562 in a round robin manner. For example, interlock unit 568 may select four words from critical queue 562A, two words from non-critical queue 562B, two requests from request queue 562C, and one coherency message from 562D during one transmission cycle. In some embodiments, interlock 568 may include logic (not shown) to prevent non-critical words from passing any critical word from the same cache line. For example, interlock 568 may compare the transaction identifiers of words stored in queues 562A and 562B and stall a non-critical word in queue 562B until the corresponding critical word in queue 562A is transmitted. An example using interlock 568 is presented below in conjunction with the description of FIG. 7.

It is noted that FIG. 6 is merely an exemplary embodiment and may be implemented differently in other embodiments. For example, in one embodiment, CLC 230 may include multiple COUs 510 that are each coupled to respective L2 caches 220. In some embodiments, additional queues may be employed (e.g., located in COU 510 or LFU 550), as desired. For example, LFU 550 may include a replay queue that stores data requests that have not yet been serviced so that they may later be retransmitted if necessary. COU 510 may also include queues for communicating with L2 cache 220 and/or an MCU 235. Queues 562 and 572 may also differ in length. In one particular embodiment, critical queue 562A may be configured to store a maximum of 8 words of data, while non-critical queue 562B may be configured to store a maximum of 56 words.

Figure 7:
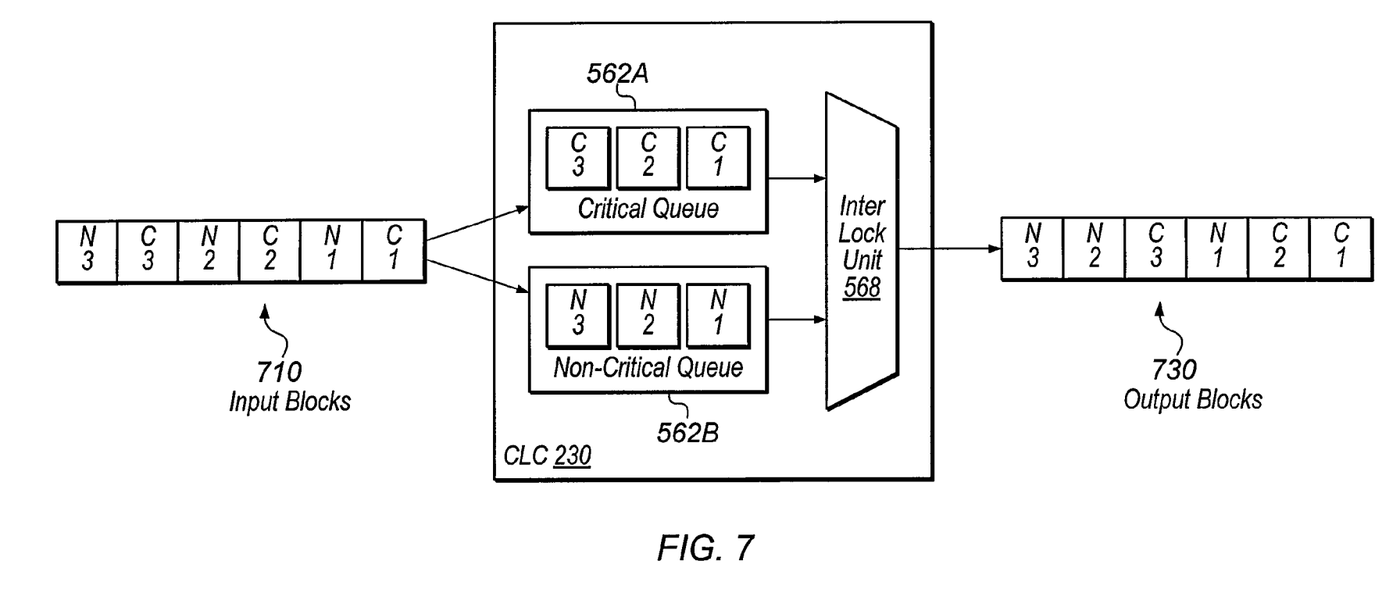
FIG. 7 is a diagram illustrating an exemplary rearrangement of cache lines in an embodiment of the CLC shown in FIG. 6.

FIG. 7 is a diagram illustrating an exemplary rearrangement of cache lines in an embodiment of the CLC shown in FIG. 6. As shown, input data blocks 710 include cache lines 1, 2, and 3. Each has both non-critical data (labeled 'N') and critical data (labeled 'C'). As the cache lines are received, the critical blocks are initially placed in critical queue 562A, and the non-critical blocks are initially placed in non-critical queue 562B. During transmission via LFU 550, interlock unit 568 may service queues 562 so that critical blocks of cache lines are given priority over the corresponding non-critical blocks. In one embodiment, interlock unit 568 may compare identifiers assigned to each block. For example, in output data blocks 730, critical blocks of cache line 1 and 2 are placed ahead of the non-critical block of cache line 1, and the critical block of cache line 3 is placed ahead of non-critical blocks of cache lines 2 and 3. Accordingly, none of the non-critical blocks of a given cache line are reordered ahead of their corresponding critical blocks of the same cache line.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

What is claimed is:

1. A computer system, comprising:
    a first processing node including a first processor, a first cache, and a first node interface;
    a second processing node coupled to the first processing node, wherein the second processing node includes a second processor, a second cache, and a second node interface;
    wherein the first node interface is configured to:
        receive, from the first processor, a first request identifying a critical word of a first cache line;
        receive, from the first processor, a second request identifying a critical word of a second cache line; and
        convey requests corresponding to the first and second requests to the second node interface;
    wherein the second node interface is configured to:
        receive the corresponding requests; and
        convey the critical words of the first and second cache lines to the first processing node before conveying non-critical words of the first and second cache lines.

2. The computer system of claim 1, wherein the first node interface is further configured to provide the conveyed critical and non-critical words of the first and second cache lines to the first cache.

3. The computer system of claim 1, wherein the second node interface is further configured to retrieve the critical and non-critical words of the first and second cache lines from the second cache or a memory associated with the second cache.

4. The computer system of claim 1, wherein the second node interface is further configured to:
    receive, from the second processor, a third request identifying a critical word of a third cache line;
    receive, from the second processor, a fourth request identifying a critical word of a fourth cache line; and
    convey additional requests corresponding to the third and fourth requests to the first node interface;
    wherein the first node interface is further configured to:
    receive the corresponding additional requests; and
    convey the critical words of the third and fourth cache lines to the second processing node before conveying non-critical words of the third and fourth cache lines.

5. The computer system of claim 1, wherein the first node interface is further configured to:
    receive a request for a critical word of a cache line that is stored in a memory associated with the first cache; and
    convey a corresponding request to a memory controller unit associated with the memory.

6. The computer system of claim 1, wherein the first node interface is further configured to:
    determine whether a physical address associated with a given received request is within a first set of addresses or a second set of addresses;
    in response to determining that the physical address is within the first set of addresses, convey a request corresponding to the given request to a memory controller unit that is associated with a memory coupled to the first processing node; and
    in response to determining that the physical address is within the second set of addresses, convey a request corresponding to the given request to the second node interface.

7. The computer system of claim 1, wherein the first node interface is configured to convey a snoop request for a particular cache line to the second node interface, and wherein the second node interface is configured to indicate to the first node interface whether the particular cache line is invalid or dirty.

8. A processing node, comprising:
    a processor;
    a cache; and
    a node interface configured to:
        receive, from the processor, a first request identifying a critical word of a first cache line;
        receive, from the processor, a second request identifying a critical word of a second cache line; and
        convey requests corresponding to the first and second requests to a second processing node;
        receive, from the second processing node, the critical words of the first and second cache lines before receiving non-critical words of the first and second cache lines.

9. The processing node of claim 8, wherein the node interface is further configured to:
    receive, from the second processing node, a third request identifying a critical word of a third cache line;
    receive, from the second processing node, a fourth request identifying a critical word of a fourth cache line; and
    convey the critical words of the third and fourth cache lines to the second processing node before conveying non-critical words of the third and fourth cache lines.

10. The processing node of claim 9, wherein the node interface includes:
    a first queue configured to store critical words; and
    a second queue configured to store non-critical words;
    wherein conveying the critical and non-critical words of the third and fourth cache lines includes arbitrating between the first and second queues.

11. The processing node of claim 10, wherein the node interface is further configured to service the first and second queues in a round robin manner.

12. The processing node of claim 9, wherein the node interface includes an interlock configured to prevent conveying non-critical words of a cache line before any critical word of the cache line.

13. The processing node of claim 10, wherein the node interface includes a third queue configured to store the corresponding requests, and wherein conveying the corresponding requests includes arbitrating between the first, second, and third queues.

14. The processing node of claim 10, wherein the node interface includes a fourth queue configured to store memory coherency messages, and wherein conveying the critical words and non-critical words of the third and fourth cache lines includes arbitrating between the first, second, and fourth queues.

15. A method comprising:
a first node interface of a first processing node receiving, from a first processor, a first request identifying a critical word of a first cache line;
the first node interface receiving, from the first processor, a second request identifying a critical word of a second cache line;
the first node interface conveying requests corresponding to the first and second requests to a second node interface of a second processing node; and
the second node interface conveying the critical words of the first and second cache lines to the first processing node before conveying non-critical words of the first and second cache lines.

16. The method of claim 15, further comprising the first node interface providing the conveyed critical and non-critical words to a cache of the first processing node.

17. The method of claim 15, further comprising:
the second node interface receiving, from a second processor, a third request identifying a critical word of a third cache line;
the second node interface receiving, from the second processor, a fourth request identifying a critical word of a fourth cache line;
the second node interface conveying additional requests corresponding to the third and fourth requests to the first node interface; and
the first node interface conveying the critical words of the third and fourth cache lines to the second processing node before conveying non-critical words of the third and fourth cache lines.

18. The method of claim 15, wherein conveying the critical and non-critical words includes the second node interface fetching the first and second cache lines from a cache of the second processing node or a memory associated with the cache.

19. The method of claim 15, wherein conveying the critical and non-critical words includes arbitrating between a first queue that stores critical words and a second queue that stores non-critical words.

20. The method of claim 15, further comprising the second node interface preventing non-critical words of a cache line from being conveyed before any critical word of the cache line.

* * * * *